Nov. 30, 1948.   D. M. VAN WINKLE ET AL   2,454,850
TORSION SPECIMEN AND HOLDER FOR SAME
Filed Nov. 28, 1944
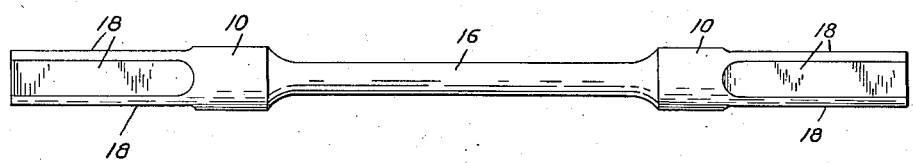
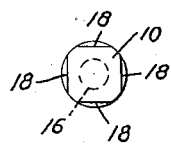
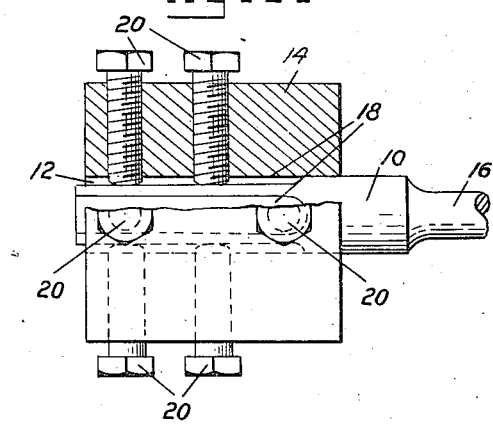
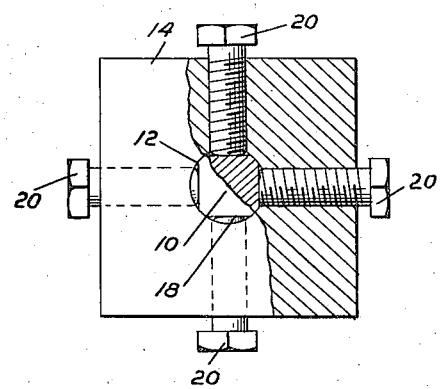
Inventors
Delbert M. Van Winkle
Donald C. Buffum Patented Nov. 30, 1948

2,454,850

UNITED STATES PATENT OFFICE 2,454,850

TORSION SPECIMEN AND HOLDER FOR SAME

Delbert M. Van Winkle, Newton, and Donald C. Buffum, Cambridge, Mass.

Application November 28, 1944, Serial No. 565,562

6 Claims. (Cl. 73—99)

(Granted under the act of March 3, 1883, as amended April 30, 1928; 370 O. G. 757)

The invention described herein may be manufactured and used by or for the Government for governmental purposes without the payment to us or any of us of any royalty thereon.

This invention relates to an improved torsional specimen and means for mounting same in a machine for testing the torsional characteristics of materials.

For certain engineering purposes, it is necessary to ascertain the torsional characteristics of materials employed, particularly such materials as steel. To obtain this information, samples of the material are prepared for insertion in a testing machine by which the sample is subjected to torques of predetermined magnitude, the angle of twist being carefully measured for each torque thus applied.

Heretofore samples of material have been prepared by taking a bar or rod of material of suitable length and diameter, turning down the intermediate portion of the sample to a standard diameter considerably less than that of the end portions, and shaping said end portions to a square cross section, these squared end portions being received in suitable holding blocks which are mounted in the machine.

In order to obtain reliable experimental values from the tests of specimens, it is necessary that the central portion of reduced diameter be accurately co-axial with the squared end portions. Great care and skill must be exercised in preparing such specimens as it is difficult to square the ends so that they are co-axial with the central portion of the specimen within the small permitted tolerances for error. This difficulty is particularly pronounced in the case of very hard steels so that it is often impossible to have specimens of such materials prepared by commercial machine shops with any guarantee of accuracy within the limits of tolerance. It is an object of the present invention to provide specimens which can readily be made accurately within the limit of tolerance, even when the material employed is hard steel. This accuracy is made possible by providing holder blocks which have cylindrical rather than squared apertures to receive the end portions of specimens. It is a relatively easy matter to make a specimen having cylindrical end portions which are co-axial with each other and with the intermediate portion of reduced diameter by turning or grinding the specimen on a lathe and lapping the cylindrical surfaces to the desired degree of accuracy.

In order to anchor securely the end portions of such specimens in the holder blocks, flats are ground on the cylindrical surfaces of the end portions to be engaged by setscrews mounted in the holder blocks as hereinafter described.

For a more complete understanding of the invention, reference may be had to the following description of an embodiment thereof and to the drawing of which:

Figure 1 is a side elevation of a torsion specimen embodying the invention.

Figure 2 is an end elevation of the same.

Figure 3 is a side elevation of a holder block adapted to receive the specimen shown in Figure 1.

Figure 4 is an end view of the block shown in Figure 3.

The torsional specimen illustrated in Figure 1 may be made in a lathe by turning and lapping the end portions 10 to a predetermined diameter so that these end portions will fit accurately into cylindrical bores 12 in holder blocks 14. The central portion 16 of the specimen is turned down to a predetermined diameter considerably less than that of the end portions 10, the diameter of the central portion 16 being accurately uniform for most of the distance between the end portions 10.

To permit the end portions 10 to be anchored firmly within the blocks 14, a suitable number of flats 18 are ground thereon, four such flats being shown in each of the end portions 10 illustrated in Figure 1. When the specimen is inserted in a pair of holder blocks 14, setscrews 20 are set up against the flats 18 so as to anchor the end portions 10 firmly against any rotative movement relative to the blocks 14. When the specimen has been properly mounted in the blocks and the blocks have been secured in the machine (not shown) a torque of predetermined magnitude is impressed on the specimen and the resultant angle of twist of the reduced central portion is carefully measured by suitable instruments (not shown).

Since accurate concentricity of the central portion and end portions of the specimen can be readily achieved by the preparation of the specimen in a lathe as hereinbefore described, accurate readings may be had indicating torsional characteristics of the specimen material. Since each flat of each end section is engaged by a set screw and since the flats are uniformly circumferentially spaced, the torque is transmitted from the machine to the specimen in a smooth, uniform and direct manner which increases the accuracy and reliability of the test readings.

We claim:

1. In combination, a chuck having a central axis of rotation and a circular cylindrical bore having its axis coincident with said chuck axis, a test specimen comprising right circular cylindrical end sections smoothly fitting said bore, and an intermediate right circular cylindrical test section of reduced diameter, said end sections each having four equal, equally circumferentially spaced flats formed thereon, each flat being separated from adjacent flats by the respective cylindrical surface of said end sections, and four equally circumferentially spaced set screws threadedly engaging said chuck and projecting into said bore, each screw having an end adapted to engage a respective one of said flats.

2. That method of constructing a torsion test specimen comprising turning said specimen to a right circular cylinder of first predetermined diameter, reducing the central portion of said specimen to form a right circular cylinder test section of second predetermined diameter coaxial with said first cylinder, to thereby define two circular cylindrical end sections, and thereafter forming four equal, uniformly circumferentially-spaced flats on said end sections, each said flat being separated from adjacent flats by a section of cylindrical surface.

3. In combination, a chuck having a central axis of rotation and a circular cylindrical bore having its axis coincident with the axis of rotation of said chuck, a test specimen comprising a right circular cylindrical end section smoothly fitting said bore and a right circular cylindrical test section of reduced diameter integral and coaxial with said end section and forming a continuation thereof, said end section having four equally-spaced flats formed thereon, each flat being separated from adjacent flats by a cylindrical surface, and four equally circumferentially spaced set screws threaded through the wall of said chuck, each said screw engaging a respective flat, a first pair of oppositely disposed screws being spaced axially of said chuck from the remaining pair of said screws.

4. The combination recited in claim 3, and four additional equally circumferentially spaced set screws threaded through the wall of said chuck each engaging a respective flat of said specimen, said additional four screws lying in a single plane normal to the axis of said chuck and spaced axially therealong from said four first-named set screws.

5. A torsional test specimen comprising right circular cylindrical end sections separated by an intermediate right circular cylindrical test section of lesser diameter than said end sections and coaxial with said end sections, the transition between each end section and said test section being smooth and gradual, each said end section having a plurality of uniformly spaced flats formed thereon parallel with the axis of said sections, each said flat being separated from adjacent flats by the cylindrical surfaces of the respective end sections.

6. A torsional test specimen comprising right circular cylindrical end sections and a right circular cylindrical intermediate test section of lesser diameter than, and coaxial with, said end sections, each said end section having four equal, equally spaced flats formed thereon parallel with the axis of said sections, each flat being separated from adjacent flats by portions of the cylindrical surface of its end section, whereby said end sections may be positively accurately centered in holders having bores equal in diameter to the cylinder diameter of said end sections.

DELBERT M. VAN WINKLE.
DONALD C. BUFFUM.

REFERENCES CITED

The following references are of record in the file of this patent:

UNITED STATES PATENTS

| Number | Name | Date |
| --- | --- | --- |
| 1,307,091 | Foster | June 17, 1919 |
| 1,317,624 | Herrman | Sept. 30, 1919 |
| 1,563,900 | Gardner et al. | Dec. 1, 1925 |
| 1,962,604 | Luerssen et al. | June 12, 1934 |

OTHER REFERENCES

Page 815 of American Machinist, Nov. 17, 1921.